Jan. 19, 1965 L. R. SMITH 3,166,721

REGULATED PULSE MODULATOR

Filed May 16, 1960

INVENTOR.
Laurence R. Smith
BY Mueller & Aichele
Attys.

3,166,721
Patented Jan. 19, 1965

3,166,721
REGULATED PULSE MODULATOR

Laurence R. Smith, Phoenix, Ariz., assignor to Motorola, Inc., Chicago, Ill., a corporation of Illinois Filed May 16, 1960, Ser. No. 29,323
7 Claims. (Cl. 331—87)

This invention relates generally to pulsed modulators and in particular to a pulsed modulator which also acts as a regulator to provide a stable output amplitude independent of supply voltage and load variations.

In high peak power pulsed modulators, as in magnetron modulators, it is desirable that the modulator deliver pulse power within relatively narrow limits in order to maintain reasonable radio frequency power output and long trouble-free life from the high power oscillator associated with such modulator. Thus, it is often necessary to provide some type of regulation of the direct current voltage supply of the modulator. Also, high power oscillator characteristics generally vary with usage in the loading of the modulator. In high power, low duty cycle modulators, the modulator design is dictated by peak current requirements. To obtain these high peak currents, large tubes are required which usually also have high dissipation capabilities. In addition, for optimum performance the modulator must be easily adjustable so that it can be used with various different oscillators and the output of the modulator should be determined by the load.

Thus, an object of the present invention is to provide a regulated pulsed modulator circuit which is of simple construction and relatively low in cost.

Another object of the invention is to provide a pulsed modulator circuit which maintains the peak current at a predetermined value relatively independent of supply voltage and load variations.

It is a further object of the present invention to provide a pulsed modulator circuit wherein the power capabilities of an electron discharge device are utilized as a shunt voltage regulator.

A feature of the invention is the provision of a regulated pulsed modulator circuit which utilizes a regulated voltage feedback circuit to stabilize the power output of the modulator.

Another feature of the invention is the provision of a regulated pulsed modulator circuit for a magnetron oscillator wherein voltage pulses are applied to the magnetron through a circuit including an impedance across which a voltage is developed which is a measure of the pulses, and this voltage is used to control the bias of the modulator to thereby control the voltage pulses and the output of the magnetron.

Still another feature of the invention is the provision of a regulated pulsed modulator circuit which includes a blocking oscillator which provides pulses for energizing a high frequency oscillator through a circuit having an impedance which develops a voltage which is a measure of the pulses, and this voltage controls the bias on the blocking oscillator to control the pulses and thereby control the oscillator power output.

A still further feature of the invention is the provision of an improved regulated pulsed modulator which has a controlled bias to control the pulse output, wherein the bias is controlled by a voltage developed in the modulator applied through a back biased diode when the voltage exceeds the back bias. The back bias may be adjusted to control the bias level and thereby control the pulse output.

Figures 1, 2, 3:
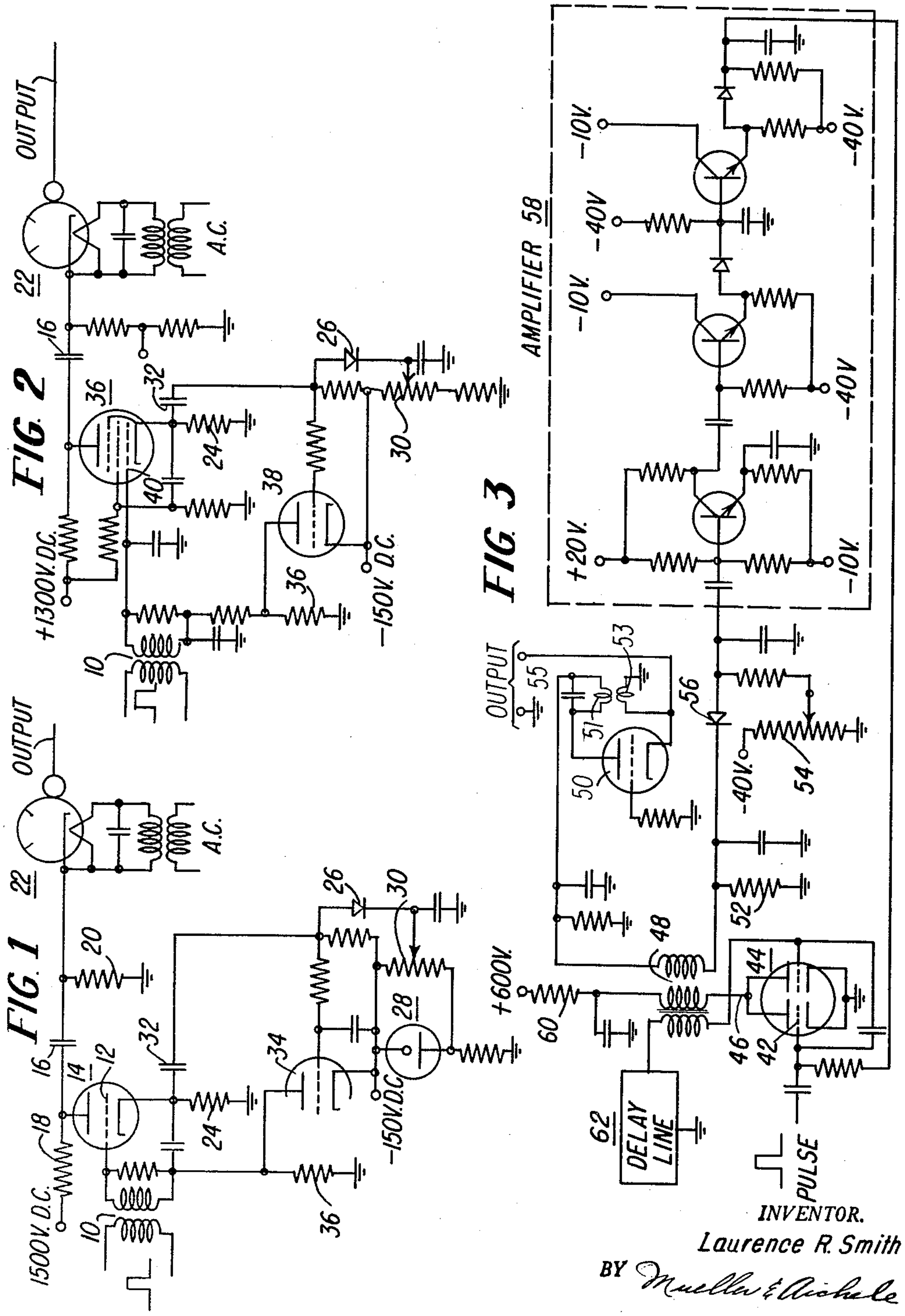
FIG. 1 is a schematic circuit diagram illustrating one embodiment of the invention including a magnetron tube and a pulsed modulator therefor regulated by a bias voltage.
FIG. 2 is a schematic circuit diagram illustrating another embodiment of the invention.
FIG. 3 is a schematic circuit diagram of another embodiment of the invention utilizing a vacuum tube oscillator and a transistorized amplifier control loop to maintain regulated direct current bias voltage at the modulator therefor.

In practicing the invention, a magnetron or other high frequency oscillator is pulsed by a pulse modulator tube. Pulse voltages are applied to the grid of the modulator tube thereby causing it to conduct. The pulse voltage at the plate of the modulator tube is controlled or regulated by the bias voltage applied to the grid of the tube. The bias is developed by a bias control circuit which responds to a voltage in the modulator circuit which varies with the plate voltage. A reverse biased diode in the bias control circuit controls the bias voltage applied to the grid of modulator tube, which in turn controls the pulse in the modulator plate circuit. The regulated pulsed modulator circuit provides stable current input to the oscillator tube thereby providing long life with constant peak power output.

Referring now to the drawings, in the circuit shown in FIG. 1 a modulating pulse is applied through transformer 10 to grid 12 of modulator tube 14. Modulator tube 14 is switched from nearly off to full conduction by the positive pulse on grid 12. Capacitor 16 which had previously charged through resistors 18 and 20 will now discharge for the duration of the grid pulse through magnetron tube 22, tube 14, and precision resistor 24. A voltage is therefore developed across this resistor which is a measure of the modulator pulse current.

Diode 26 is reverse biased a predetermined amount by voltage regulator tube 28 and potentiometer 30 so that if the positive pulse voltage across resistor 24 exceeds this bias, capacitor 32 will become charged thereby increasing the bias on tube 34. The increased bias will decrease the conduction of tube 34 so that the voltage drop across resistor 36 will decrease. This will decrease the bias voltage on tube 14 thereby allowing tube 14 to conduct more current which reduces the rate of charge of capacitor 16 and thus the voltage across capacitor 16, and consequently reduce the pulse current of magnetron tube 22. The feedback process will stabilize when the peak voltage across resistor 24 is nearly equal to the reverse bias voltage across diode 26. This provides effective regulation of the magnetron pulse current.

The circuit schematic diagram shown in FIG. 2 is similar to that shown in FIG. 1 except that voltage regulator tube 28 in FIG. 1 has been eliminated as the bias supply voltage may be sufficiently well regulated. Also, pentode tube 36 is utilized as the modulator tube rather than a triode 14 as shown in FIG. 1. The elements in FIG. 2 have been numbered with the same reference characters as the corresponding functional elements in FIG. 1.

Thus, a pulse is applied through transformer 10 to the control grid of pentode tube 36 causing it to conduct. Capacitor 16 will discharge for the duration of the grid pulse through magnetron tube 22, tube 36, and resistor 24. The pulse voltage across resistor 24 is a measure of the modulator pulse current and the current that flows through magnetron tube 22.

As in FIG. 1, diode 26 is reverse biased by the voltage drop across the top portion of potentiometer 30. The bias voltage applied to pentode tube 36 is controlled as described in FIG. 1 thus controlling the direct current plate voltage of tube 36 and in turn controlling the pulse current fed to magnetron tube 22 when grid 40 is driven to zero bias. Potentiometer 30 sets the pulse power level for magnetron tube 22.

FIG. 3 is a schematic diagram exemplifying another embodiment of the invention. A pulse is applied to the grid 42 of dual triode tube 44 which acts as a blocking oscillator. The pulses produced at the plates 46 of tube 44 are fed through transformer 48 to pulse modulate the radio frequency oscillator including tube 50. The oscillator in this instance may utilize a pencil triode tube 50 suitable for generation of microwave energy in the 1000 megacycle region. Tube 50 oscillates only during the time when a pulse is applied to energize the same from the output of transformer 48. The pulse voltage of transformer 48 is applied to tube 50 through a circuit including resistor 52. The voltage drop across resistor 52 which is effectively in series with R.F. oscillator tube 50 is a measure of the plate current. Inductor elements 51 and 53 are mutually coupled to each other and are connected to the anode and cathode respectively of tube 50. The output from tube 50 can be taken across the cathode inductor as shown at 55. Potentiometer 54 sets the conduction point of diode 56, and the amplifier control loop circuit 58 keeps the pulse voltage across resistor 52 just equal to the direct current voltage level set by potentiometer 54. The direct current voltage produced by the amplifier control loop 58 is applied to the grid 42 of tube 44 to control the plate supply voltage of tube 44 which controls the pulse produced at the plates 46 of the blocking oscillator tube. Delay line 62 controls the width of the pulse generated by blocking oscillator 44. Blocking oscillator tube 44 therefore, produces pulses of energy which are converted to pulses of high frequency current by oscillator tube 50.

Thus, the invention provides a regulated pulsed modulator circuit which utilizes the power dissipation capabilities of the modulator tube by also using it as a shunt regulator thereby allowing the modulator to be adjusted for a given R.F. oscillator and at the same time maintaining uniform power output.

I claim:

1. A pulse modulator circuit including in combination, an electron device having an output electrode and at least one control electrode, pulsing means coupled to said control electrode, bias voltage means coupled to said control electrode to apply a bias voltage thereto to cause said device to operate in a quiescent condition wherein said device conducts current at less than a fully saturated condition, energy supply means coupled to said output electrode, energy storage means coupled to said output electrode and to said supply means, a load coupled to said storage means, impedance means coupled in series with said load, said pulsing means applying a pulse voltage to said control electrode to cause said device to operate in its fully saturated condition, said storage means being responsive to said device in its saturated condition to apply a pulse of energy to said load whereby pulse current is caused to flow through said load and said impedance means, the magnitude of said pulse current being determined by the amount of energy stored in said storage means, said impedance means developing a control voltage in response to said pulse current, means coupling said impedance means to said bias voltage means for applying said control voltage thereto to control said bias voltage on said electron device to thereby regulate the amount of energy storage in said storage means so that said pulse current remains substantially constant.

2. A pulse modulator circuit including in combination, an electron device having an output electrode and a control electrode, pulsing means coupled to said control electrode, bias voltage means coupled to said control electrode to apply a bias voltage thereto to cause said device to operate in a quiescent condition wherein said device conducts current at less than a fully saturated condition, energy supply means coupled to said output electrode, energy storage means coupled to said output electrode and to said supply means, a load coupled to said storage means, impedance means coupled to said electron device, said pulsing means applying a pulse voltage to said control electrode to cause said device to operate in a fully saturated condition, said storage means being responsive to said device in its saturated condition to apply a pulse of energy to said load whereby a pulse current is caused to flow through said load, said impedance means, said device and said storage means in series, the magnitude of said pulse current being determined by the amount of energy stored in said storage means, said impedance means developing a control voltage in response to said pulse current, means coupling said impedance means to said bias voltage means for applying said control voltage thereto to control said bias voltage on said electron device to thereby regulate the amount of energy storage in said storage means whereby said pulse current remains substantially constant.

3. A pulse modulator circuit including in combination, an electron discharge device having an anode, a cathode and a control grid, pulsing means coupled to said control grid, bias voltage means coupled to said control grid to apply a bias thereto to cause said device to operate in a quiescent condition wherein said device conducts current at less than a fully saturated condition, energy supply means coupled to said anode, energy storage means coupled to said anode and to said supply means, a load coupled to said storage means, impedance means coupled to said cathode, said pulsing means applying a pulse voltage to said control grid to cause said device to operate in its fully saturated condition, said storage means being responsive to said device in its saturated condition to apply a pulse of energy to said load whereby a pulse current is caused to flow through said load, said impedance means, said device and said storage means in series, the magnitude of said pulse current being determined by the energy stored in said storage means, said impedance means developing a control voltage in response to said pulse current, means coupling said impedance means to said bias voltage means for applying said control voltage thereto to control said bias voltage on said electron device to thereby regulate the amount of energy stored in said storage means, whereby said pulse current remains substantially constant.

4. A pulse modulator circuit including in combination, an electron device having an output electrode and at least one control electrode, pulsing means coupled to said control electrode, bias voltage means coupled to said control electrode to apply a bias voltage thereto to cause said device to operate in a quiescent condition wherein said device conducts current at less than a fully saturated condition, energy supply means coupled to said output electrode, energy storage means coupled to said output electrode and to said supply means, a load coupled to said storage means, impedance means coupled to said electron device, said pulsing means applying a pulse voltage to said control electrode to cause said device to operate in a fully saturated condition, said storage means being responsive to said device in its saturated condition to apply a pulse of energy to said load whereby a pulse current is caused to flow through said load and said impedance means, the magnitude of said pulse current being determined by the amount of energy stored in said storage means, said impedance means developing a control voltage in response to said pulse current, circuit means including a reversed biased diode coupling said impedance means to said bias voltage means, said control voltage acting to bias said diode in the forward direction, said circuit means and said bias voltage means being responsive to said control voltage to cause said bias voltage to change when said control voltage exceeds the reverse bias voltage across said diode to control the conduction of said electron device to thereby regulate the amount of energy storage in said storage means whereby said pulse current remains substantially constant.

5. A pulse modulator circuit including in combination, a first electron device having an output electrode and a first control electrode, pulsing means coupled to said first control electrode, bias voltage means coupled to said first control grid to apply a bias voltage thereto to cause said device to operate in a quiescent condition wherein said device conducts current at less than a fully saturated condition, energy supply means coupled to said output electrode, energy storage means coupled to said output electrode and to said supply means, a second electron device having a second control electrode, means coupling said second control electrode to said storage means, impedance means coupled to said first electron device, said pulsing means applying a pulse voltage to said first control electrode to cause said first electron device to operate in its fully saturated condition, said storage means being responsive to said first electron device in its saturated condition to apply a pulse of energy to said second control electrode whereby a pulse current is caused to flow through said second electron device and said impedance means, the magnitude of said pulse current being determined by the amount of energy stored in said storage means, said impedance means developing a control voltage in response to said pulse current, means coupling said impedance means to said bias voltage means for applying said control voltage thereto to control said bias voltage on said first electron device to thereby regulate the amount of energy storage in said storage means, whereby said pulse current remains substantially constant.

6. A pulse modulator circuit including in combination, an electron device having an output electrode and at least one control electrode, pulsing means coupled to said control electrode, bias voltage means coupled to said control electrode to apply a bias voltage thereto to cause said device to operate in a quiescent condition wherein said device conducts current at less than a fully saturated condition, energy supply means, energy storage means coupled to said output electrode, means including a resistor coupling said energy supply means to said output electrode and said energy storage means, a load coupled to said storage means, impedance means coupled in series with said load, said pulsing means applying a pulse voltage to said control electrode to cause said device to operate in a fully saturated condition, said storage means being responsive to said device in its saturated condition to apply a pulse of energy to said load whereby a pulse current is caused to flow through said load, and said impedance means, the magnitude of said pulse current being determined by the amount of energy stored in said storage means, said impedance means developing a control voltage in response to said pulse current, means coupling said impedance means to said bias voltage means for applying said control voltage thereto to control said bias voltage on said electron device to thereby regulate the amount of energy storage in said storage means whereby said pulse current remains substantially constant.

7. A pulsed modulator circuit including in combination an electron device having an output electrode and at least one control electrode, pulsing means coupled to said control and output electrodes, bias voltage means coupled to said control electrode to apply a bias voltage thereto to cause said device to operate in a quiescent condition wherein said device conducts current at less than a fully saturated condition, energy supply means, energy storage means coupled to said energy supply means, first circuit means including a transformer coupling said energy supply means and said energy storage means to said output electrode, a load, impedance means coupled in series with said load, second circuit means including said transformer coupling said load to said energy storage means, said pulsing means applying a pulse voltage to said control and output electrodes to cause said device to operate in a fully saturated condition, said storage means being responsive to said device in its saturated condition to apply a pulse of energy to said load whereby a pulse current is caused to flow through said load and said impedance means, the magnitude of said pulse current being determined by the amount of energy stored in said storage means, said impedance means developing a control voltage in response to said pulse current, means coupling said impedance means to said bias voltage means for applying said control voltage thereto to control said bias voltage on said electron device to thereby regulate the amount of energy stored in said storage means whereby said pulse current remains substantially constant.

References Cited in the file of this patent

UNITED STATES PATENTS

| | | |
|---|---|---|
| 2,496,044 | Fernsler | Jan. 31, 1950 |
| 2,767,255 | Talamini | Oct. 16, 1956 |
| 2,857,481 | Philips | Oct. 21, 1958 |
| 2,864,058 | Fredrick | Dec. 9, 1958 |